United States Patent [19]
Bernhardt

[11] Patent Number: 5,220,958
[45] Date of Patent: Jun. 22, 1993

[54] ARRANGEMENT FOR DRIVING OUT OF VOLATILE IMPURITIES FROM GROUND WATER

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 746,101

[22] Filed: Aug. 15, 1991

[30] Foreign Application Priority Data

Aug. 29, 1990 [DE] Fed. Rep. of Germany ....... 4027304

[51] Int. Cl.$^5$ ...................... E21B 43/00; B01D 19/00
[52] U.S. Cl. ...................... 166/67; 166/242; 166/370; 210/170
[58] Field of Search ............... 166/242, 369, 370, 380, 166/67, 265, 267, 228; 210/170, 220

[56] References Cited

U.S. PATENT DOCUMENTS

| | | | |
|---|---|---|---|
| 4,821,800 | 4/1989 | Scott et al. | 166/228 |
| 4,886,119 | 12/1989 | Bernhardt et al. | 166/267 |
| 4,943,305 | 7/1990 | Bernhardt | 210/220 X |
| 4,950,394 | 8/1990 | Bernhardt et al. | 166/51 X |
| 5,050,676 | 9/1991 | Hess et al. | 166/267 |
| 5,076,360 | 12/1991 | Morrow | 166/267 |
| 5,082,053 | 1/1992 | Bernhardt | 166/67 X |
| 5,095,975 | 3/1992 | Bernhardt | 166/67 |
| 5,111,883 | 5/1992 | Savery | 166/269 |

FOREIGN PATENT DOCUMENTS

| | | |
|---|---|---|
| 3625488 | 10/1987 | Fed. Rep. of Germany. |
| 939675 | 6/1982 | U.S.S.R. ............ 166/369 |

Primary Examiner—Hoang C. Dang
Attorney, Agent, or Firm—Michael J. Striker

[57] ABSTRACT

An arrangement for driving out of volatile impurities from ground water and a ground region through which the ground water flows has a well shaft extending to a region with contaminated ground water, and a nozzle member for introducing a gas into the ground water in the shaft. The nozzle member is formed by a sieve wall portion of the well shaft arranged above a ground water level in the ground region, so that it can be located at least partially underneath the ground water during a raising of the ground water level in the well shaft under the action of a negative pressure produced in the well shaft, and a filter insert arranged upstream of the sieve wall portion.

7 Claims, 2 Drawing Sheets

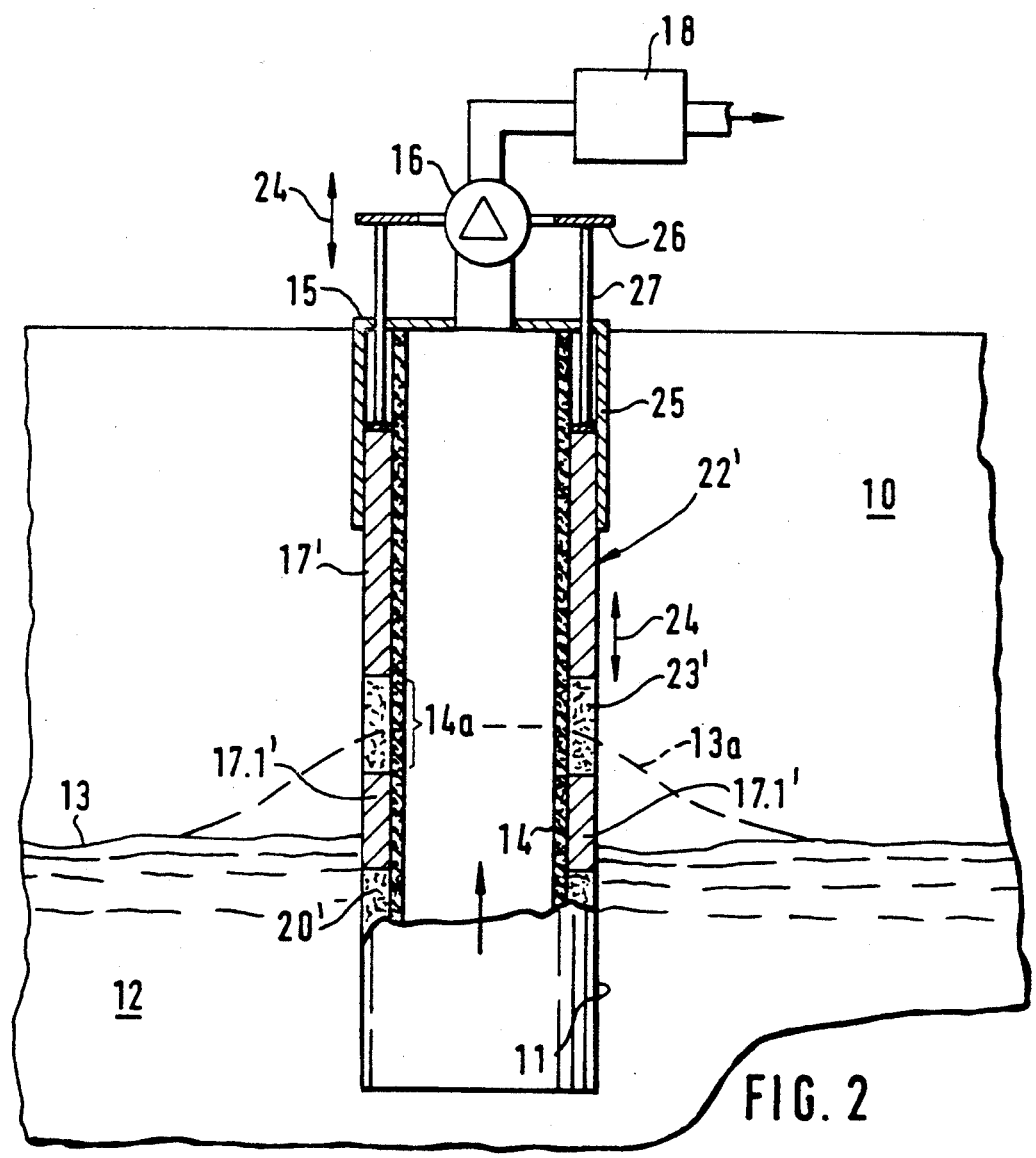

ARRANGEMENT FOR DRIVING OUT OF VOLATILE IMPURITIES FROM GROUND WATER

BACKGROUND OF THE INVENTION

The present invention relates to an arrangement for driving out of volatile impurities from ground water and a ground region through which the ground water passes. More particularly, it relates to such an arrangement of the above mentioned type, in which the volatile impurities are driven out by producing a negative pressure in a well shaft extending in the region of the contaminated ground water, and also by supply of a gas, particularly air, through a nozzle member in the ground water in the well shaft.

Arrangements of the above mentioned general type are known in the art. One of such arrangements is disclosed for example in the German document DE-OS 3,625,488. In this arrangement air or gas is supplied under the action of the negative pressure produced in the well shaft through a conduit into an air receiving chamber under the ground water level in the well shaft. The air receiving chamber is separated by a nozzle plate from a water chamber, and the nozzle plate is suspended on a float in an adjustable distance underneath the water surface. The arrangement has been proven extraordinarily successful in practice. However, in the event of very narrow diameters of the shaft difficulties arise in mounting of the float and the nozzle plate.

SUMMARY OF THE INVENTION

Accordingly, it is an object of the present invention to provide an arrangement for driving out of volatile impurities from the ground water, which avoids the disadvantages of the prior art.

More particularly, it is an object of the present invention to provide an arrangement of the above mentioned general type which is suitable for well shafts with relatively small diameters.

In keeping with these objects and with others which will become apparent hereinafter, one feature of the present invention resides, briefly stated, in an arrangement for driving out volatile impurities from the ground water, in which the nozzle member is formed by a sieve wall portion of the well shaft which is arranged above the ground water level of the ground so that, in response to raising of the ground water level in the shaft as a result of the negative pressure produced in the shaft, it is located at least partially underneath the ground water level raised under the action of the negative pressure, and a filter insert is arranged in front of the sieve wall portion.

The negative pressure causes an aspiration of air or other gases from the surrounding ground region through the nozzle body into the shaft. Air, which flows above the ground water level into the shaft roughens the water surface in the shaft and releases individual droplets. Thereby air can also move under the ground water layer. The air is broken by the openings of the sieve wall into fine bubbles which during their travel to the water surface bind the volatile impurities dissolved in water, such as for example, chlorinated hydrocarbons, and removes the same from the water. The filter insert located upstream contributes to the desired penetration of the air into the water region, since in the filter region a closed water surface is eliminated. The filter insert and the joining sealing packings can be adjustable together on the sieve wall of a well tube pipe.

The water located in the well shaft is cooled in the upper region by the negative pressure build-up and the passage of the air, and thereby contributes to a circulation of the water in the well shaft. Therefore always new water quantities are moved in the cleaning region underneath the water surface in the shaft.

For regulating of the post flow of the air and/or water, filter inserts can also be arranged in front of other sieve wall regions of the shaft. In especially dense ground layers, supply of air can be facilitated in that, additional openings can be provided in the ground region around the well shaft. Air or other purifying gases can be supplied in these additional openings under pressure, to increase the efficiency of the arrangement. Advantageously, also a fan can be regulatable as to its power. Therefore, the produced negative pressure can be adjusted to different edge conditions, such as a diameter of the well shaft, ground density, as well as the type of impurities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a schematic view showing a longitudinal section corresponding to that of FIG. 1, but showing a second embodiment of the arrangement in accordance with the present invention.

DESCRIPTION OF THE PREFERRED EMBODIMENTS

Figure 1:
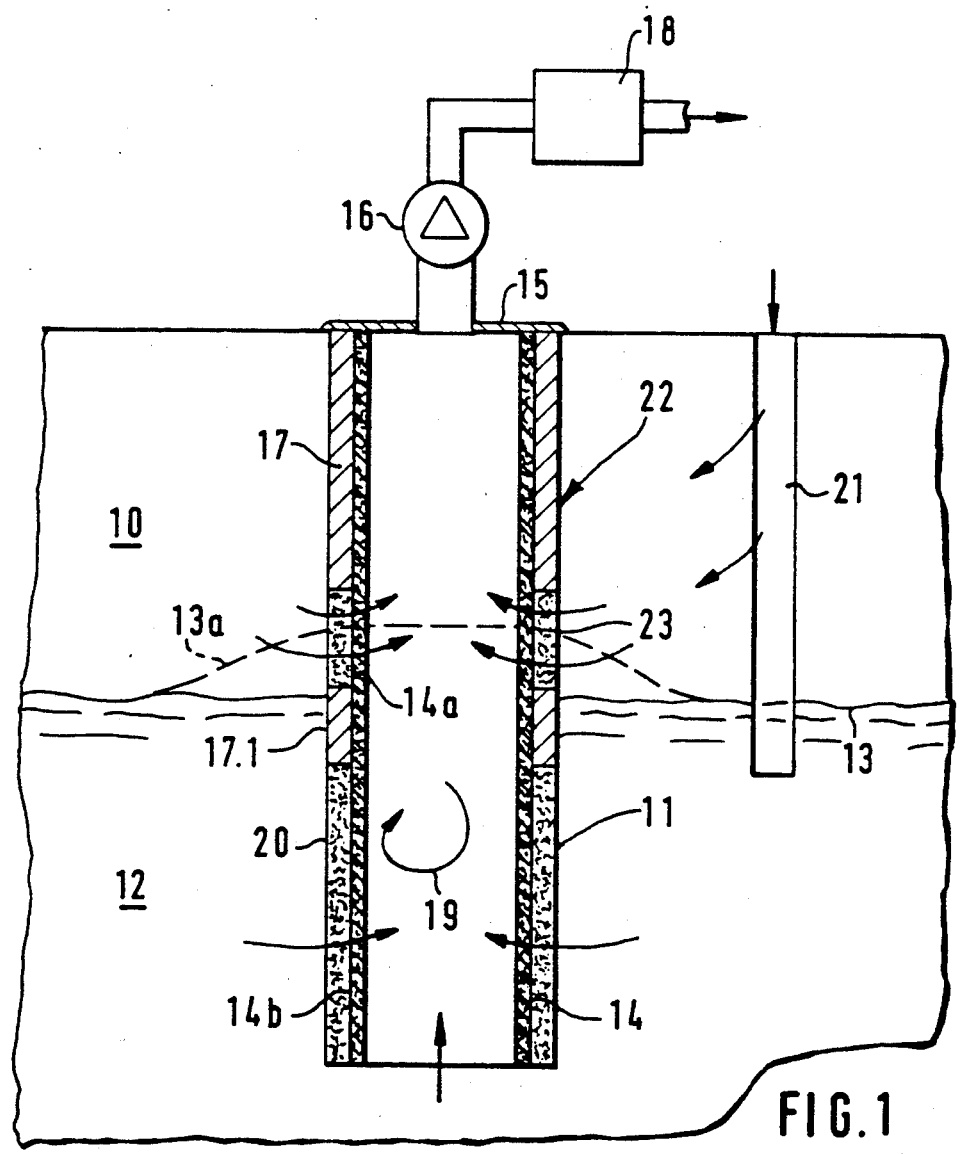
FIG. 1 is a schematic view showing a longitudinal section of an arrangement for driving out of volatile impurities from the ground water, in accordance with a first embodiment of the present invention.

As shown in the drawings a wall shaft is provided in a ground region 10 and extends to a region 12 of contaminated ground water. The ground water level is identified with a line 13. A well pipe 14 is inserted in the well shaft 11. The well pipe 14 has a sieve wall which is subdivided by an outer casing 22 into water-permeable and water-impermeable wall portions 14a and 14b. The well shaft 11 is air tightly closed with a cover 15 on the ground surface. A blower 16 is arranged above the cover 15 for producing negative pressure in the well shaft 11. The power of the blower 16 is regulatable by a not shown control unit.

The negative pressure produced in the shaft 11 acts for raising the ground water level 13 in the well shaft 11 and around the well shaft 11, as identified with a broken line 13a. In the region of the raised ground water level 13a the well shaft 14 has a sieve wall region 14a which is located partially underneath the ground water level 13a and partially above the ground water level 13a in the shaft. Sealing packings 17 and 17' are arranged in the casing 22 above and below the sieve wall region 14a, for enabling a desired introduction of air or other gases from the ground region 10 through the sieve wall region 14a into the well shaft 11. The negative pressure produced by the blower 16 is selected to be of such a value that it cannot be compensated by a post-flow of the ground water into the shaft 11. Thereby the air which is aspirated above the ground water level 13a through the sieve wall region 14a into the shaft, obtains a high flow speed and can roughen the water surface in the shaft. The thusly produced foam generation and the tearing of the droplets from the water surface facilitates the inflow of the air also underneath the ground water level 13a into the well shaft 11.

The air or other purifying gases are broken into fine bubbles during their passage through the sieve wall portion 14a at its nozzle openings. These bubbles rise through the water under the action of the negative pressure in the well 11, and the volatile impurities dissolved in water bind on the bubbles and can be consistently dragged. Above the ground water level 13a the air together with the impurities is transported from the well shaft 11 by the blower 16. The blower 16 is followed by a filter device 18. The impurities can be retained in the filter device, before the purified air or the gas is again released outwardly.

Bringing the air into the ground water is facilitated when a filter insert 23 is mounted before the sieve wall region 14a in the casing 22. In the filter insert 23 the closed ground water surface is forcibly broken.

In the embodiment shown in FIG. 1, the well pipe 14 and the casing 22 are both fixedly connected with the cover 15. In the embodiment of FIG. 2, the casing 22' with its sealing packing 17' and 17.1' and its filter regions 23' and 20' is arranged so that it is longitudinally displaceable on the well shaft 14 in direction of the double arrow 24. Thereby the water-permeable wall region 14a can be adjusted in accordance with the water level 13. The casing 22' is guided in an outer cylinder 25 which is mounted on the cover 15. It is adjustable on a schematically shown adjusting ring 26 which is connected with the casing 22' by rod 27.

Due to the negative pressure which acts in the valve shaft 11 and the passage of air or gas bubbles through the upper region of the ground water in the well shaft 11, the water cools in this region and thereby contributes to a circulation of the ground water in the well shaft 11, as shown by the arrow 19 in FIG. 1. The circulation transports new ground water both through the not closed shaft bottom and also through the sieve wall region 14b of the well pipe 14 in the lower shaft region into the interior of the shaft. Filter inserts 20 are arranged before the sieve wall region 14b of the well shaft 14. They regulate the post-flow quantity of the ground water in the well shaft 11 and prevent penetration of the ground region.

The post-flow of air or other gases can be facilitated by providing of additional openings or boreholes 21 shown in FIG. 1 in the area surrounding the well shaft 11. With the openings 21 it is possible to introduce air or other purifying gases under pressure into the ground region 10 and therefore increase the efficiency of the whole arrangement. The additional openings can extend advantageously to the area under the ground water level in the ground region, in order to compensate fluctuations in the ground water level and to aerate the capillary layer arranged directly under the water level in the ground region.

It will be understood that each of the elements described above, or two or more together, may also find a useful application in other types of constructions differing from the types described above.

While the invention has been illustrated and described as embodied in an arrangement for driving out of volatile impurities from the ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for driving out of volatile impurities from ground water and a ground region through which the ground water flows, comprising a well shaft extending to a region with contaminated ground water; means producing a negative pressure in said well shaft; a nozzle member for introducing a gas into the ground water in said shaft, said nozzle member being formed by a sieve wall portion of said well shaft arranged above a ground water level in the ground region, so that it can be located at least partially underneath the ground water during a raising of the ground water level in said well shaft under the action of the negative pressure produced in said well shaft; a filter insert arranged upstream of said sieve wall portion as considered in a direction of water flow, said shaft having a wall which is continuously formed as a sieve wall; and a casing which surrounds said sieve wall and is movable relative to said sieve wall in a longitudinal direction.

2. An arrangement as defined in claim 1, wherein said casing is composed of sealing packings and filter inserts.

3. An arrangement for driving out of volatile impurities from ground water and a ground region through which the ground water flows, comprising a well shaft extending to a region with contaminated ground water; means producing a negative pressure in said well shaft; a nozzle member for introducing a gas into the ground water in said shaft, said nozzle member being formed by a sieve wall portion of said well shaft arranged above a ground water level in the ground region, so that it can be located at least partially underneath the ground water during a raising of the ground water level in said well shaft under the action of the negative pressure produced in said well shaft, so that since said nozzle member is formed by said sieve wall portion, the gas is broken into fine bubbles during its passage through said sieve wall portion, the bubbles rise through the water under the action of said negative pressure in said well shaft, and the volatile impurities dissolved in water bind on the bubbles and are unsupported from said wall shaft together with the bubbles; and a filter insert arranged upstream of said sieve wall portion as considered in a direction of water flow, said nozzle member extending over a whole periphery of said well shaft, said well shaft having additional sieve wall portions; and additional filter inserts located upstream of said additional sieve wall portions as considered in a direction of a water flow for regulating a post-flow of water and/or air.

4. An arrangement as defined in claim 3; and further comprising boreholes provided around said well shaft.

5. An arrangement as defined in claim 4; and further comprising means for supplying gas or air under pressure into said boreholes.

6. An arrangement as defined in claim 3 wherein said means for producing the negative pressure in said well shaft have an adjustable power.

7. An arrangement as defined in claim 6, wherein said means for producing said negative pressure include a fan.

* * * * *